(12) United States Patent
Bedenk

(10) Patent No.: US 9,016,952 B2
(45) Date of Patent: Apr. 28, 2015

(54) ROLLER BEARINGS

(75) Inventor: Johannes Bedenk, Theres (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 13/567,652

(22) Filed: Aug. 6, 2012

(65) Prior Publication Data

US 2013/0315523 A1    Nov. 28, 2013

(30) Foreign Application Priority Data

May 24, 2012   (DE) .......................... 10 2012 208 744

(51) Int. Cl.
*F16C 27/00* (2006.01)
*F16C 13/00* (2006.01)
*F01D 25/16* (2006.01)
*F16C 27/04* (2006.01)

(52) U.S. Cl.
CPC ............ *F01D 25/162* (2013.01); *F16C 27/045* (2013.01); *F01D 25/164* (2013.01)

(58) Field of Classification Search
CPC .... F01D 25/164; F16C 27/045; F16C 35/077; F16C 2360/23
USPC .............. 384/99, 215, 445, 513, 515, 535, 384/558–559, 562, 581; 415/110–111, 415/174.5, 231; 416/1
See application file for complete search history.

(56) References Cited

U.S. PATENT DOCUMENTS

| | | | | |
|---|---|---|---|---|
| 4,337,982 A | * | 7/1982 | Moringiello et al. | 384/99 |
| 4,693,616 A | * | 9/1987 | Rohra et al. | 384/99 |
| 6,240,719 B1 | * | 6/2001 | Vondrell et al. | 60/223 |
| 6,413,046 B1 | * | 7/2002 | Penn et al. | 416/1 |
| 6,443,698 B1 | | 9/2002 | Corattiyil et al. | 416/1 |
| 6,540,483 B2 | * | 4/2003 | Allmon et al. | 416/1 |
| 6,682,219 B2 | * | 1/2004 | Alam et al. | 384/99 |
| 7,384,199 B2 | | 6/2008 | Allmon et al. | 384/581 |
| 7,707,902 B2 | * | 5/2010 | Haaser et al. | 73/862.49 |

FOREIGN PATENT DOCUMENTS

| | | | | |
|---|---|---|---|---|
| EP | 1008726 A2 | * | 6/2000 | F01D 21/04 |
| EP | 2113639 A2 | * | 11/2009 | F01D 25/16 |

* cited by examiner

*Primary Examiner* — Marcus Charles
(74) *Attorney, Agent, or Firm* — Fitzpatrick, Cella, Harper & Scinto

(57) ABSTRACT

A roller bearing that includes a number of rolling elements located between an inner ring and an outer ring, a housing component to which the outer ring is non-rigidly attached, wherein the outer ring is designed in a single piece and comprises a track section that abuts against the housing component, a spring section comprising radial inner and radial outer spring rods and a flange that is bolted to the housing component, wherein the radial inner springrods are connected together with the radial outer spring rods by way of a single connecting ring.

5 Claims, 1 Drawing Sheet

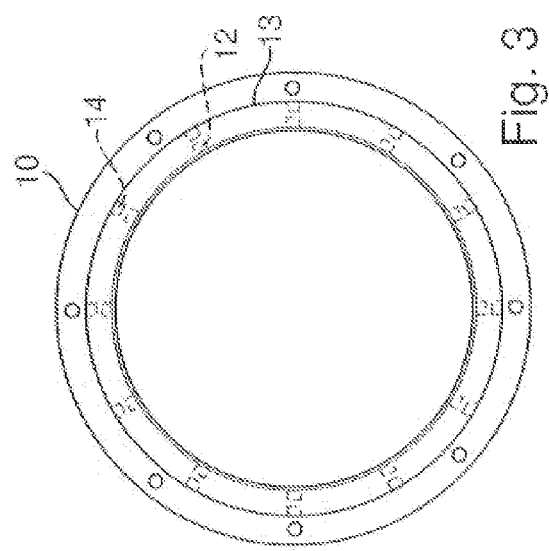
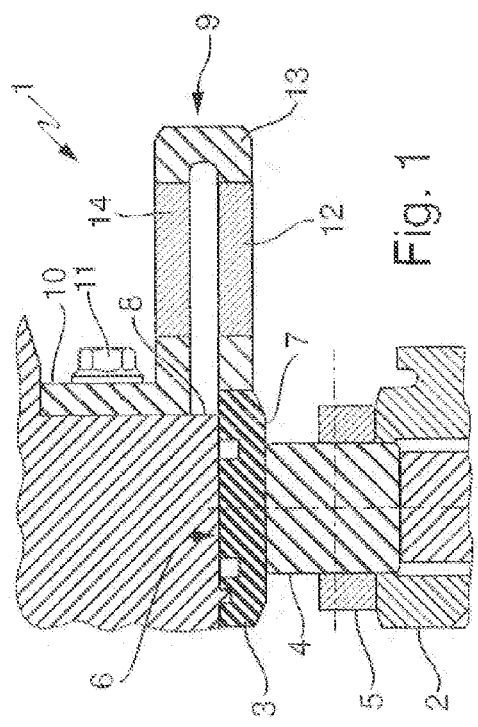
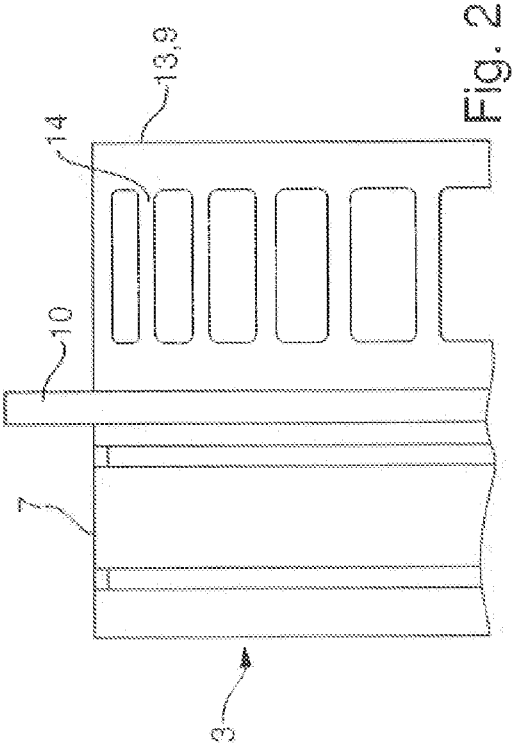

ROLLER BEARINGS

BACKGROUND OF THE INVENTION

1. Field of the Invention

The invention relates to a roller bearing suitable for use in a gas turbine in particular, for example in the jet engine of an aircraft, and comprises an elastic outer ring that is attached to a housing part.

2. Description of Related Art

A roller bearing of the type mentioned above is known from U.S. Pat. No. 7,384,199 B2, for example.

A roller bearing with a damping system that is also suitable for use in a gas turbine is known from DE 10 2009 056 662 A1. The damping system comprises a damping cavity that is filled with a damping medium.

OBJECT OF THE INVENTION

The object of the invention is to improve upon a roller bearing in comparison to the prior art mentioned, in particular with regard to spring and damping properties.

SUMMARY OF THE INVENTION

This object is achieved according to the invention by way of a roller bearing with the features of claim 1. For a roller bearing suitable for a gas turbine in particular, this involves
a number of rolling elements located between an inner ring and an outer ring,
a housing component where the outer ring is flexibly attached, wherein the outer ring is designed in a single piece and contains a track section that abuts against the housing component, a spring section that comprises radial inner and radial outer spring rods, and a flange bolted to the housing component, wherein the radial inner spring rods are connected together with the radial outer spring rods by way of a single connecting ring.

Improvements in the roller bearing according to the invention are the object of the dependent claims. The term "inner ring" used in Claim 1 is to be understood functionally and includes any rotatable radial component disposed inside the outer ring, the rolling elements rolling along said inner ring. The roller bearing is always designed as a radial bearing.

The invention starts from the consideration that in supporting fast-moving turbine shafts using rolling bearings it makes sense to non-rigidly suspend the roller bearing outer ring in the housing in combination with a squeeze-film damper located between the outer ring and the housing so that any oscillations arising in the critical resonance ranges of the turbine shaft are dampened, and to cushion the transfer of these oscillations to the housing.

Compared to the prior art, the invention is characterized in that a single non-elastic element, namely a connecting ring, is placed between a number of radial inner spring rods and a number of radial outer spring rods, the ring enabling in particular a flexible tailoring of the elasticity of the outer ring in the radial direction as required.

Preferably, the spring section, which has a U-shaped cross section formed from an inner and an outer spring rod and from a section of the connecting ring, has non-linear spring characteristics, whereby a progressive spring characteristic curve preferably results.

The progressivity of the spring characteristic curve of the entire spring section can be achieved or supported by having the connecting ring abut against a housing section after a short spring travel when the outer ring is deflected, so that from this point on only one of the spring rods can enable further deflection.

In a preferred embodiment, the radial inner spring rods have spring characteristics that are different from those of the radial outer spring rods. In the process, the radial outer spring rods are softer than the radial inner spring rods.

DESCRIPTION OF THE DRAWINGS

Below, an exemplary embodiment of the invention will be explained in more detail with the help of a drawing. Shown therein are:

FIG. 1 cross section of a roller bearing of a gas turbine.

FIGS. 2 and 3 the roller bearing from FIG. 1 from other views.

The roller bearing shown in FIGS. 1 to 3, identified in all by reference number 1, is designed as a cylindrical roller bearing and is to be installed in a gas turbine for supporting the turbine shaft. With regard to the principle function of the roller bearing 1, reference is made to the prior art cited above.

The roller bearing 1 comprises rolling elements 4 located between an inner ring 2 and an outer ring, the rolling elements being cylindrical rolls. Instead of rolling along the inner ring 2, the rolling elements 4 could also roll directly along a shaft. The individual rolling elements 4 are separated from one another by a cage 5.

A track section 7 of the outer ring 3 sits against a housing section 8 with a squeeze-film damper 6 located between them. The track section 7 of the outer ring 7 transitions in one piece to a spring section 9 that is U-shaped in cross section according to FIG. 1. The spring section in turn transitions in one piece to a flange 10 that is fastened to the housing section 8 with screws 11.

The spring section 9 is made up of a number of radial inner spring rods 12, a single connecting ring 13, and a number of radial outer spring rods 14. In the process, in the exemplary embodiment the number of radial inner spring rods 12 is identical to the number of radial outer spring rods 14. However, embodiment types can also be implemented in which the number of radial inner spring rods 12 differs from the number of radial outer spring rods 14. In any case, the radial inner spring rods 12 are located on the same side of the connecting ring 13 as the radial outer spring rods 14 such that, in the cross section according to FIG. 1 the spring rods 12, 14 each depict an arm of the U and the connecting ring 13 depicts a U base that connects these U arms. Each of the spring rods 12, 14 is located parallel to the axis of rotation of the roller bearing 1, wherein the radial inner spring rods 12 are located in the straight axial extension of the track section 7.

In the simplified cross sectional view according to FIG. 1, both types of spring rods 12, 14 appear to be similar, wherein the outer spring rod 14 is disposed exactly radially outside the inner spring rod 12. Optionally, by designing the geometry of the spring rods 12, 14 differently, a spring characteristic curve for the entire spring section 9 can be provided which is not linear, but progressive. In this case, the radial outer spring rod 14 has lower spring stiffness than the radial inner spring rod 12, whereas the connecting ring 13 has no spring-like characteristics.

When the radial outer spring rod 14 is deflected, which is equivalent to a narrowing of the gap between the track section 7 of the outer ring 3 and the housing component 8 created by the squeeze-film damper 6, the connecting ring 13 shifts at least slightly in the radial direction. This shift can be limited by way of a stop, which is not shown, but which is fixed relative to the housing component 8 and against which the connecting ring 13 or another part of the outer ring 3 abuts. A damping means can be provided at this point, in particular in the form of an additional squeeze-film damper. Likewise, a stop can be provided in the opposite radial direction, which prevents the track section 7 from lifting too far off from the housing component 8. Minor movements of the track section 7 are possible in the axial direction of the roller bearing 1 as well. The closed form and thereby the stiffness, as well as the relatively high mass of the connecting ring 13 is a vibrational advantage with regard to both radial and axial oscillations of the outer ring 3.

PARTS LIST

1 Roller bearing
2 Inner ring
3 Outer ring
4 Roller bearing
5 Cage
6 Squeeze-film damper
7 Track section
8 Housing component
9 Spring section
10 Flange
11 Screw
12 radial inner spring rod
13 Connecting ring
14 radial outer spring rod

What is claimed is:

1. A roller bearing comprising:
    a number of rolling elements located between an inner ring and an outer ring;
    a compressible layer; and
    a housing component to which the outer ring is non-rigidly attached,
    wherein the outer ring is a single piece and comprises a track section, a spring section comprising radial inner and radial outer spring rods, and a flange that is bolted to the housing component,
    wherein the compressible layer is disposed between the track section and the housing component so as to create a gap between the track section and the housing component,
    wherein when the radial outer spring rod is deflected, the compressible layer is compressed to narrow the gap,
    wherein the radial inner spring rods are connected together with the radial outer spring rods by way of a single connecting ring.

2. A roller bearing according to claim 1, wherein the radial inner spring rods have spring characteristics that are different from those of the radial outer spring rods.

3. A roller bearing according to claim 2, wherein the radial outer spring rods are softer than the radial inner spring rods.

4. A roller bearing according to one of claims 1, 2, and 3, wherein the rolling elements are cylindrical rolls.

5. A roller bearing comprising:
    a number of rolling elements located between an inner ring and an outer ring; and
    a housing component to which the outer ring is non-rigidly attached,
    wherein the outer ring is a single piece and comprises a track section that abuts against the housing component, a spring section comprising radial inner and radial outer spring rods, and a flange that is bolted to the housing component,
    wherein the radial inner spring rods are connected together with the radial outer spring rods by way of a single connecting ring, and
    wherein a longitudinal cross-section of the outer surface of each of the radial inner and outer spring rods extends in a direction parallel to a rotational axis of the roller bearing.

* * * * *